United States Patent
Uehori

(10) Patent No.: US 8,302,000 B2
(45) Date of Patent: Oct. 30, 2012

(54) ENLARGING DOCUMENT ELEMENTS

(75) Inventor: Yukiyo Uehori, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 526 days.

(21) Appl. No.: 12/619,435

(22) Filed: Nov. 16, 2009

(65) Prior Publication Data

US 2010/0332972 A1 Dec. 30, 2010

(30) Foreign Application Priority Data

Jun. 30, 2009 (JP) ................................. 2009-155504

(51) Int. Cl.
*G06F 17/00* (2006.01)
(52) U.S. Cl. ........................................ 715/252; 715/249
(58) Field of Classification Search .................. 715/234, 715/243, 249, 252, 271
See application file for complete search history.

(56) References Cited

U.S. PATENT DOCUMENTS 7,085,999 B2 8/2006 Maeda et al.
2004/0135813 A1 7/2004 Kanai
2006/0195784 A1 * 8/2006 Koivisto et al. ................ 715/523
2009/0027419 A1 * 1/2009 Kondo et al. .................. 345/649

FOREIGN PATENT DOCUMENTS

JP 2001-184344 A 7/2001
JP 2004-118477 A 4/2004
JP 2009244941 A * 10/2009

OTHER PUBLICATIONS

Machine transalation of JP2009244941A, JPO May 23, 2012.*

* cited by examiner

*Primary Examiner* — Adam M Queler
(74) *Attorney, Agent, or Firm* — Sughrue Mion, PLLC

(57) ABSTRACT

A document processor includes a unit which receives document information including plural document elements as a target document, a unit which detects each of the document elements from the received target document, a unit which generates an element image enlarged by a specified ratio, of each image of the detected document elements, and a display control unit which controls display so that an element image of the corresponding document element is displayed in a range occupied by the document element in the target document.

3 Claims, 7 Drawing Sheets

BITMAP IMAGE (ENLARGED)

EXTRACTED IMAGE

ARRANGEMENT RESULT

ENLARGING DOCUMENT ELEMENTS

CROSS-REFERENCE TO RELATED APPLICATIONS

This application is based on and claims priority under 35 USC 119 from Japanese Patent Application No. 2009-155504 filed Jun. 30, 2009.

BACKGROUND (1) Technical Field

This invention relates to a document processor, a document processing method, and a computer readable medium.

(2) Background Art

In a user terminal having two screens, a content is displayed on a first display unit as intended by a creator of the content. The displayed content includes plural content blocks and each content can be enlarged in every block. The content instructed to be enlarged is displayed on a second display unit. The content displayed on the second display unit is enlarged and the enlargement has a rule; for example, an image is displayed enlarged in the same vertical and horizontal ratio.

SUMMARY

According to an aspect of the present invention, there is provided a document processor including: a unit which receives document information including plural document elements as a target document, a unit which detects each of the document elements from the received target document, a unit which generates an element image enlarged by a specified ratio, of each image of the detected document elements, and a display control unit which controls display so that an element image of the corresponding document element is displayed in a range occupied by the document element in the target document.

BRIEF DESCRIPTION OF THE DRAWINGS

Exemplary embodiment(s) of the present invention will be described in detail based on the following figures, wherein.

DETAILED DESCRIPTION

Figure 1:
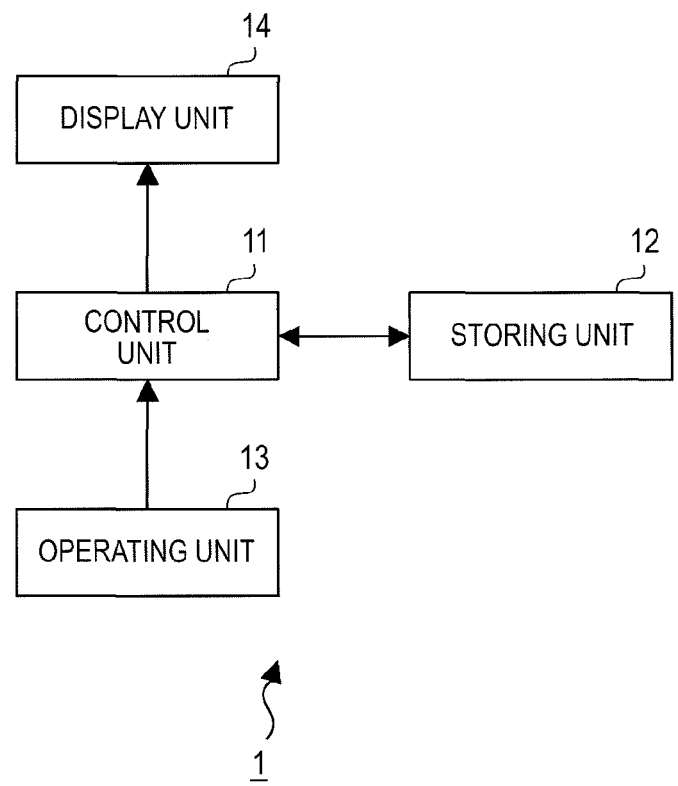
FIG. 1 is a block diagram showing a structural example of a document processor, according to an exemplary embodiment of the invention.

Exemplary embodiments of the invention will be described with reference to the drawings. A document processor 1 according to the exemplary embodiments of the invention includes a control unit 11, a storing unit 12, an operating unit 13, and a display unit 14, as illustrated in FIG. 1. The control unit 11 is a program controlling device such as CPU (central processing unit), which operates according to a program stored in the storing unit 12.

In the exemplary embodiment, the control unit 11 receives document information including plural document elements as a target document and detects each document element from the received target document. It generates an element image enlarged by the specified ratio, in each element image of the detected document elements and displays the enlarged element image of the corresponding document element, in the range occupied by the corresponding document element in the whole target document. The concrete contents of the processing by the control unit 11 will be described later.

The storing unit 12 is a memory device, which stores a program executed by the control unit 11. The program may be provided being stored in a computer readable recording medium such as DVD-ROM (Digital Versatile Disc Read Only Memory), transferred to the document processing device 1 of the exemplary embodiment through a communication means (not illustrated) such as a serial interface and a network, and stored in the storing unit 12.

The storing unit 12 stores the document information to be processed. The document information may be transferred to the document processor 1 of this exemplary embodiment through the communication means (not illustrated) such as a serial interface and a network and stored in the storing unit 12.

Figure 2:
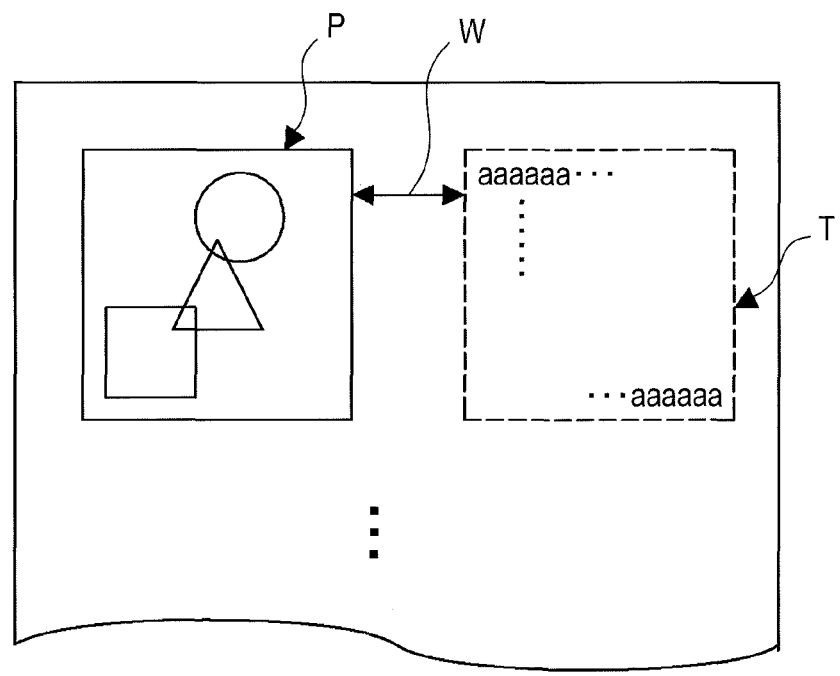
FIG. 2 is a view for use in describing an example of an image of a target document in the document processor, according to the exemplary embodiment of the invention.

As illustrated in FIG. 2, the document information to be processed in the exemplary embodiment includes plural partitioned areas such as a text area T with letter strings arranged and a picture area P with pictures arranged, which are adjacent to each other with a blank space W (a blank equal to or larger than at least the letter spacing). The text and the picture in these areas are referred to as document elements. As a method for detecting this document element, layout analysis is well known. The storing unit 12 of the exemplary embodiment further operates as a work memory of the control unit 11.

The operating unit 13 is a keypad, which receives a user's instruction operation, and outputs the contents of the instruction operation to the control unit 11. The display unit 14 is a liquid crystal display device, which displays the specified image, according to the instruction supplied from the control unit 11.

Figure 3:
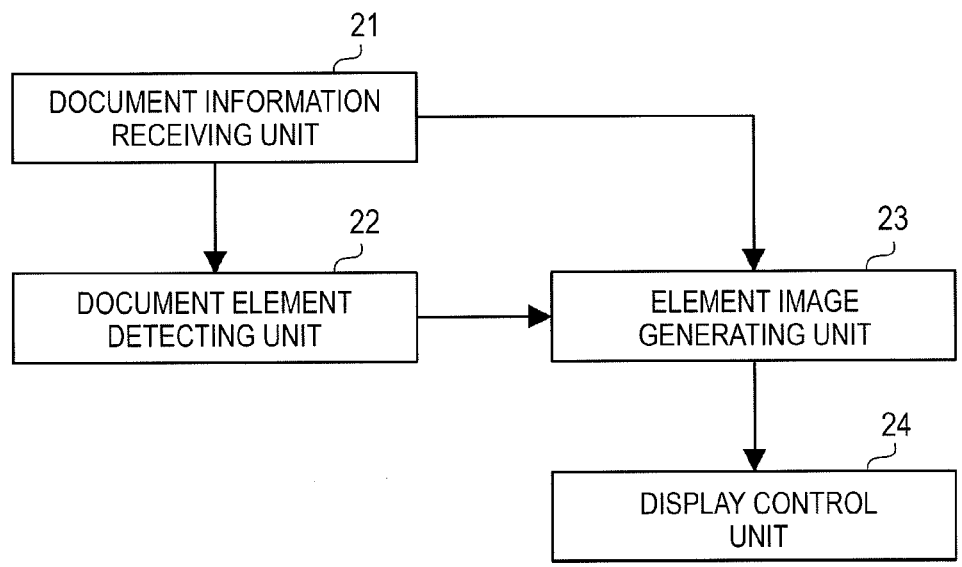
FIG. 3 is a functional block diagram of an example of the document processor, according to the exemplary embodiment of the invention.

Next, the operation of the control unit 11 will be described. In the exemplary embodiment, the control unit 11 executes the program stored in the storing unit 12, hence to realize the document processor 1 including functions as a document information receiving unit 21, a document element detecting unit 22, an element image generating unit 23, and a display control unit 24, as illustrated in FIG. 3.

The document information receiving unit 21 receives the target document to be processed. Specifically, the document information receiving unit 21 may store the document information received through the communication means, not illustrated, into the storing unit 12 and read out the document information as the target document. Alternatively, it may read out the document information which has been previously stored in the storing unit 12, as the target document.

The document element detecting unit 22 detects the document element from the target document read out by the document information receiving unit 21. Various kinds of known layout analysis processing may be used for the above processing.

[When Document Information Contains a Group of Drawing Instructions]

For example, when document information that is the target for the processing is the data of PDF (Portable Document Format), the respective document elements are divided into data portions called as objects. In this case, the document element detecting unit 22 detects a portion to be drawn by an object as a document element. As for every object, it takes out the drawing range thereof (the information indicating where in the target document it should be drawn) and the drawing instruction included in the object as the element data.

The information of the drawing range can be expressed with the positional coordinates (Xlt, Ylt) of the left upper corner and the positional coordinates (Xrb, Yrb) of the right lower corner in the above drawing range with the left upper corner of the target document defined as the original point (here, Xlt, Ylt, Xrb, and Yrb are defined by a unit indifferent to the resolution of the display device such as centimeter and inch).

[When Document Information Contains a Bitmap Image]

When a target document contains a bitmap image, the document element detecting unit 22 may perform the following processing: it converts the target document image into white and black binary code to generate binary data. Next, the document element detecting unit 22 performs the labeling processing on the binary data and specifies plural pixel groups (conjunct pixel groups) including a series of black pixels.

Further, the document element detecting unit 22 defines a rectangle circumscribing each conjunct pixel group as the basic rectangle, for every specified conjunct pixel group. It generates the coordinate information (coordinate information for defining the rectangle) of each basic rectangle. The document element detecting unit 22 issues the identifier inherent in each defined basic rectangle and stores the identifier into the storing unit 12, together with its corresponding coordinate information of each basic rectangle.

With the pixel on the left upper end in the target document defined as an initial position, the document element detecting unit 22 scans each pixel from left to right in every line, starting from the initial position of the target document. When much more pixels defined as a white pixel in the labeling processing are detected consecutively than a predetermined threshold in a horizontal direction, it detects this conjunct pixel portion as a horizontal separator. The document element detecting unit 22 generates the information for specifying the horizontal separator (the coordinates of the left end pixel in the target document and the coordinates of the right end pixel in the target document) and stores it into the storing unit 12. The document element detecting unit 22 performs this processing downwardly in every line.

With the pixel of the left upper end of picture candidate portion data to be processed defined as the initial position, the document element detecting unit 22 scans each pixel downwardly in every line, starting from the initial position. When much more pixels defined as a white pixel in the labeling processing are detected consecutively than a predetermined threshold in a vertical direction, it detects this conjunct pixel portion as a vertical separator. The document element detecting unit 22 generates the information for specifying the vertical separator (the coordinates of the upper end pixel in the target document and the coordinates of the lower end pixel in the target document) and stores it into the storing unit 12. The document element detecting unit 22 performs this processing from left to right in every line.

For example, the threshold in the horizontal direction is for dividing the own area from the other area in multiple paragraph layout and it is previously defined as a value larger than the width of the blank space between horizontally adjacent letters (between basic rectangles) and smaller than the width of the blank space between the horizontally adjacent paragraphs (adjacent areas). The threshold in the vertical direction is for distinguishing the text area including two and more lines of letter strings from the vertically adjacent areas and it is previously defined as a value larger than the width of the blank space between the text lines (between the vertically adjacent basic rectangles) and smaller than the width of the blank space between the vertically adjacent areas. The setting may be performed by a user in advance. As an example, statistic is taken for letter space, paragraph space, line space, and layout space in some document information and the setting may be decided according to this.

The document element detecting unit 22 selects one of the basic rectangles stored in the storing unit 12 as a notable basic rectangle and sequentially selects another basic rectangle stored in the storing unit 12, which has not been selected as the notable basic rectangle, as the target basic rectangle, hence to do the following processing.

The document element detecting unit 22 generates a vector to the central coordinates of the notable basic rectangle (when the coordinate information shows the coordinates of the vertexes standing on the diagonal line of the basic rectangle, the coordinates of the center point) and to the central coordinates of the target basic rectangle. It calculates a distance between the notable basic rectangle and the target basic rectangle, according to the size of the vector (the square root of sum of squares of the components). When the calculated distance is equal to or smaller than a predetermined distance threshold, it checks whether or not the calculated vector crosses with any of the separators specified by the information stored in the storing unit 12. As this processing, well-known processing can be used for checking whether two lines are crossing with each other or not. Here, when the calculated vector doesn't cross with any of the detected separators, it stores the identifier of the notable basic rectangle associated with the identifier of the target basic rectangle into the storing unit 12.

According to the processing, identifiers of basic rectangles corresponding to letters and figure included in the same image element (each area partitioned by the separators) are associated with each other. The document element detecting unit 22 specifies at least one set of plural basic rectangles associated with each other and defines a rectangle circumscribing the basic rectangles included in the specified set as an image element circumscribed rectangle.

When the document element detecting unit 22 defines the image element circumscribed rectangle, it extracts a bitmap image portion in the defined image element circumscribed rectangle from the image of the source target document. The document element detecting unit 22 defines the coordinate information (the coordinates of the left upper corner and the coordinates of the right lower corner) for specifying the defined image element circumscribed rectangle and the bitmap image portion extracted from the image element circumscribed rectangle as the element data.

The element image generating unit 23 performs the enlargement processing of an image at the specified ratio on the image portion included in the element data detected by the document element detecting unit 22 and generates an element image to be displayed.

Specifically, the element image generating unit 23 defines an enlargement ratio $\beta$, according to the user's operation with the operating unit 13. For example, the element image generating unit 23 defines the value (for example, 1.0) previously specified as a default at a startup of the processing as the enlargement ratio $\beta$. Upon receipt of a user's instruction operation (for example, user's operation of pushing an upward button of the cross key) for raising the enlargement ratio, the element image generating unit 23 increases the enlargement ratio by the predetermined ratio $\Delta\beta$. Here, a maximum value $\beta$max may be determined so as not to increase the enlargement ratio $\beta$ beyond the above maximum limit. Upon receipt of the user's instruction operation (for example, user's operation of pushing a downward button of the cross key) for decreasing the enlargement ratio, the element image generating unit 23 decreases the enlargement ratio $\beta$ by the predetermined ratio $\Delta\beta$ in the range of $\beta>1.0$.

At a startup of the processing and at a time of changing the enlargement ratio $\beta$, the element image generating unit 23 generates an image enlarged about the image portion included in the element data, according to the enlargement ratio $\beta$ at that point. The image is generated through the following processing, separately when the information included in the element data contains the information of the drawing range and the drawing instruction (the information extracted from the drawing instruction such as PDF) and when the information included in the element data contains the coordinate information for specifying the image element circumscribed rectangle and the bitmap image portion.

[When the Element Data Contains the Drawing Instruction]

When the information included in the element data contains the information of the drawing range and the drawing instruction, the element image generating unit 23 obtains the information on the drawing range of the element data, the size of the target document, and the resolution of the display unit 14.

The information on the resolution of the display unit 14 is the information about the number of pixels included in the display unit 14, defined by the pixel number Px arranged in the horizontal direction and the pixel number Py arranged in the vertical direction. The information on the size of the target document may be defined by the width W and the height H. The width W and the height H may be defined by a unit indifferent to the resolution of a display device and the like, such as centimeter and inch.

The element image generating unit 23 arranges an image of the size W×H in the range of Px×Py pixels and obtains the number a of pixels per a unit of length. Specifically, the element image generating unit 23 calculates Px/W and Py/H and defines the smaller one as the value $\alpha$. In other words, $\alpha=\min[Px/W, Py/H]$. Here, the min [a, b] means the smaller value of a and b.

While sequentially selecting element data as the notable element data, the element image generating unit 23 performs the following processing: it reads out the positional coordinates (Xlt, Ylt) of the left upper corner and the positional coordinates (Xrb, Yrb) of the right lower corner as the information of the drawing range of the notable element data. The element image generating unit 23 acquires a storing area for the pixel having height $\alpha\times\beta\times|Ylt-Yrb|$ and width $\alpha\times\beta\times|Xlt-Xrb|$ (|Z| means the absolute value of Z) in the storing unit 12. The element image generating unit 23 stores the information for specifying the position of the storing area (position on the storing unit 12, for example, head address) associated with the notable element data into the storing unit 12.

The element image generating unit 23 draws an image on the storing area acquired in the storing unit 12, according to the drawing instruction included in the notable element data. Here, it multiplies the values of the coordinates specified by the drawing instruction by $\beta$ to draw the image, thereby obtaining the image enlarged correspondingly to the size of the acquired storing area. The element image generating unit 23 executes the above mentioned processing for every element data, hence to obtain the result of the enlargement processing corresponding to the respective element data (referred to as enlarged bitmap image).

[When the Element Data Contains Bitmap Image]

When the information included in the element data contains the coordinate information for specifying the image element circumscribed rectangle and the bitmap image portion, the element image generating unit 23 obtains the information for specifying the image element circumscribed rectangle included in the element data, the bitmap image portion in the specified image element circumscribed rectangle, the information on the size of the target document, and the information on the resolution of the display unit 14.

The information on the resolution of the display unit 14 is the information about the number of pixels included in the display unit 14, for example, defined by the pixel number Px arranged in the horizontal direction and the pixel number Py arranged in the vertical direction. On the other hands, the information on the size of the target document may be defined by the width w and the height h. The width w and the height h are determined by the number of pixels.

The element image generating unit 23 obtains the following value (size ratio) $\alpha'$, assuming that the image of the size w×h is arranged in the range of Px×Py pixels. The element image generating unit 23 calculates Px/w and Py/h and defines the smaller value as $\alpha'$. Namely, $\alpha'=\min[Px/w, Py/h]$. Here, the min [a, b] means the smaller value of a and b.

While sequentially selecting the element data as the notable element data, the element image generating unit 23 performs the following processing: it reads out the positional coordinates (xlt, ylt) of the left upper corner and the positional coordinates (xrb, yrb) of the right lower corner as the information for specifying the image element circumscribed rectangle of the notable element data. These positional coordinates are expressed by the number of pixels with the left upper corner of the target document set as the original point. The positional coordinates (x, y) mean the position moved from the original point rightward (in the x axis direction) by x pixel and downward (in the y axis direction) by y pixel.

The element image generating unit 23 acquires a storing area of the pixel having the height $\alpha'\times\beta\times|ylt-yrb|$ and the width $\alpha'\times\beta\times|xlt-xrb|$ (|Z| means the absolute value of Z) in the storing unit 12. The element image generating unit 23 stores the information for specifying the position of the storing area (position on the storing unit 12, for example, head address) associated with the notable element data, into the storing unit 12.

The element image generating unit 23 performs the enlargement processing to multiply the bitmap image portion (since this bitmap image portion originally has the size of the image element circumscribed rectangle, the size is of the height |ylt−yrb| and the width |xlt−xrb|) included in the notable element data by $\alpha'\times\beta$ vertically and horizontally and stores the result into the storing area acquired in the storing unit 12. Thus, it obtains the bitmap image enlarged correspondingly to the size of the acquired storing area. The element image generating unit 23 performs the above mentioned processing on every element data hence to obtain a bitmap image (enlarged bitmap image) after the enlargement processing corresponding to the respective element data.

The display control unit 24 displays the enlarged bitmap image generated by the element image generating unit 23 in the display range of the target document on the display unit 14: width $\alpha \times Px/W$ and height $\alpha \times Py/H$ or width $\alpha' \times Px/w$ and height $\alpha' \times Py/h$, by clipping the above image in the range occupied by the above image in the target document.

Specifically, the display control unit 24 sequentially selects the element data and takes out the information of the drawing range or the coordinate information for specifying the image element circumscribed rectangle included in the selected element data. The display control unit 24 reads out the enlarged bitmap image stored in the storing unit 12 correspondingly to the i-th element data (where, i=1, 2, ... N, N is the total number of the element data). Hereinafter, the range in which an image corresponding to the i-th element data is drawn is expressed with the coordinates (ui_lt, vi_lt) of the left upper corner and the coordinates (ui_rb, vi_rb) of the right lower corner. The coordinates are expressed by the number of pixels.

For example, when the i-th element data includes the information of the drawing range and the range is expressed with the positional coordinates (Xi_lt, Yi_lt) of the left upper corner and the positional coordinates (Xi_rb, Yi_rb) of the right lower corner, which are indifferent to the resolution of the display device, the following expressions are satisfied:

$$ui\_lt = \alpha \times Xi\_lt,$$

$$vi\_lt = \alpha \times Yi\_lt,$$

$$ui\_rb = \alpha \times Xi\_rb, \text{ and}$$

$$vi\_rb = \alpha \times Yi\_rb,$$

by using the number $\alpha$ of pixels per a unit length calculated (or supplied from the element image generating unit 23) in the same way as in the element image generating unit 23. On the other, when the information included in the element data contains the coordinate information for specifying the image element circumscribed rectangle and the bitmap image portion, and when it contains the positional coordinates (xi_lt, yi_lt) of the left upper corner and the positional coordinates (xi_rb, yi_rb) of the right lower corner as the information for specifying the image element circumscribed rectangle in the i-th element data, the following expressions are satisfied:

$$ui\_lt = \alpha' \times xi\_lt,$$

$$vi\_lt = \alpha' \times yi\_lt,$$

$$ui\_rb = \alpha' \times xi\_rb, \text{ and}$$

$$vi\_rb = \alpha' \times yi\_rb,$$

by using the size ratio $\alpha'$.

Figure 4:
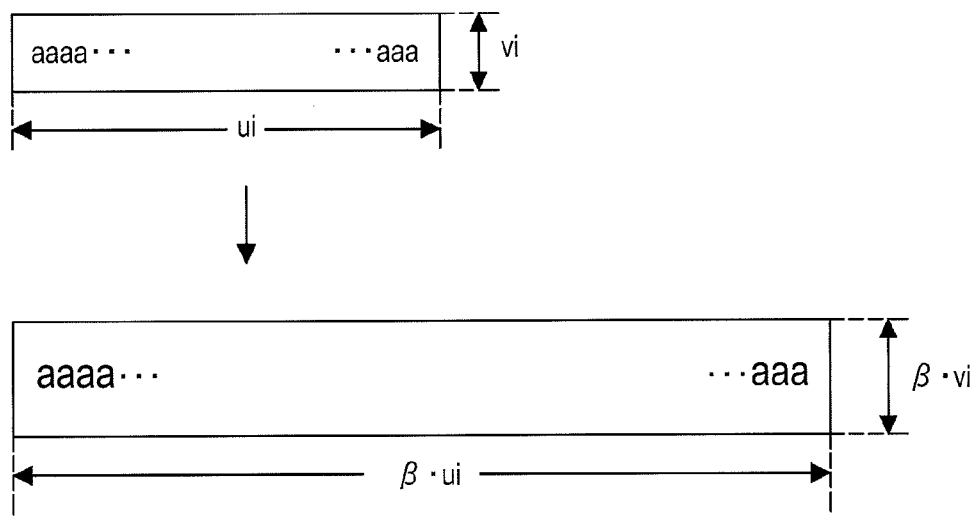
FIG. 4 is a view for use in describing an example of enlargement processing by the document processor, according to the exemplary embodiment of the invention.

The expressions $ui = |ui\_rb - ui\_lt|$ and $vi = |vi\_rb - vi\_lt|$ are established. As mentioned above, the bitmap image stored associated with the i-th element data is enlarged in size by multiplying the size corresponding to the width ui and the height vi of the drawing range or the image element circumscribed rectangle of the i-th element data by $\beta$. Therefore, the size of the bitmap image stored associated with the i-th element data is of the width $\beta \times ui$ and the height $\beta \times vi$ (FIG. 4).

Figure 5:
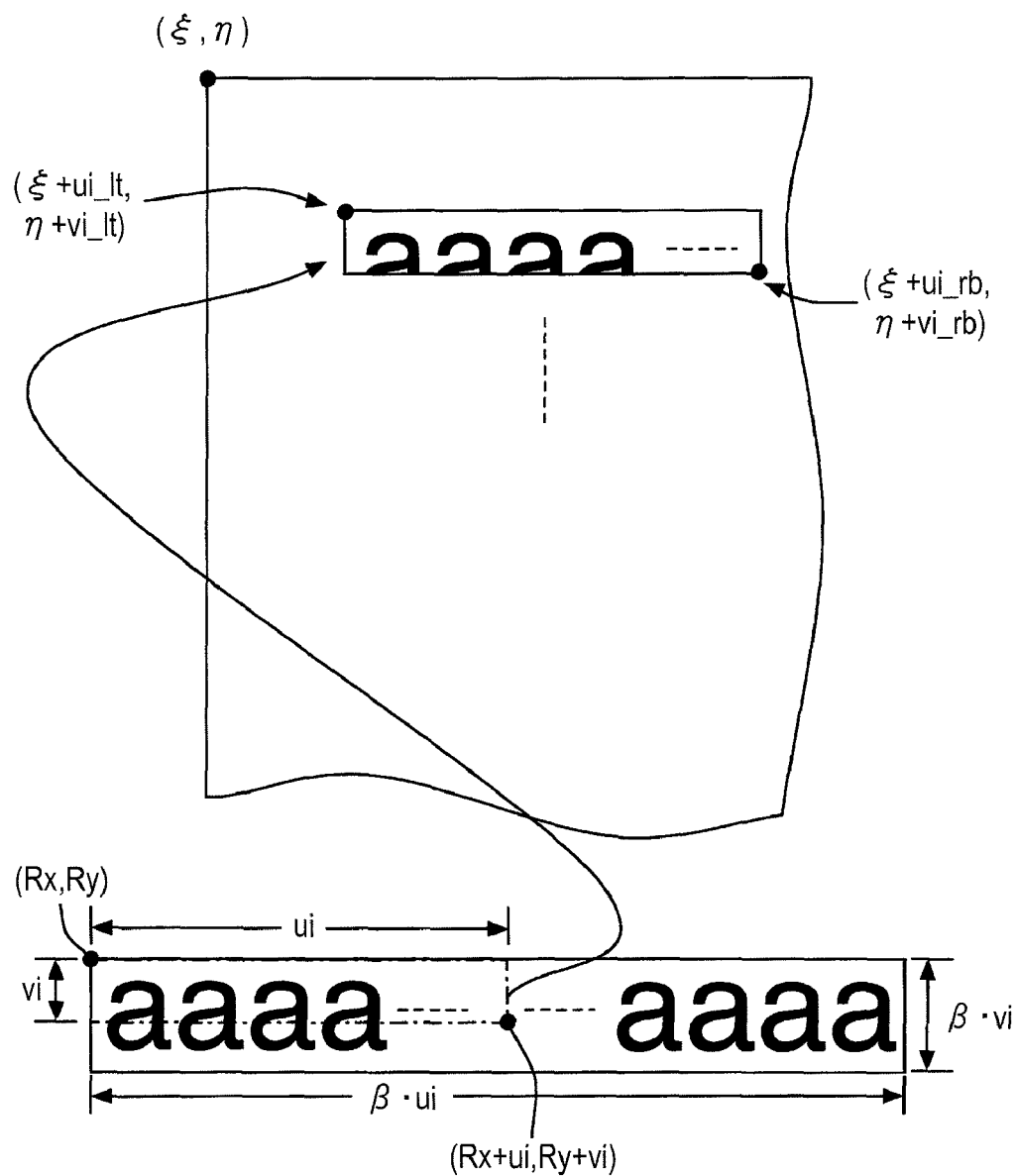
FIG. 5 is a view for use in describing an example of the processing by the document processor, according to the exemplary embodiment of the invention.

As illustrated in FIG. 5, the display control unit 24 cuts out the range of the width ui and the height vi, from the bitmap image in the size of the width $\beta \times ui$ and the height $\beta \times vi$ (where, i=1, 2 ... ) corresponding to the element data and draws the image in the range (the width ui and the height vi) from ($\xi$+ui_lt, $\eta$+vi_lt) to ($\xi$+ui_rb, $\eta$+vi_rb) on the display unit 14. The coordinates ($\xi$, $\eta$) indicate the coordinates of the left upper corner of the display range in the display unit 14 (FIG. 5).

The display control unit 24 first cuts the range having the width ui and the height vi starting from a predetermined reference position (for example, from the upper left corner (0, 0) of the enlarged bitmap image), out of the enlarged bitmap image in the size of the width $\beta \times ui$ and the height $\beta \times vi$ (where, i=1, 2 ... ). According to a user's operation of scroll instruction, the display control unit 24 changes the reference position to change the cut out range. For example, every time a user pushes the rightward button of the cross key, the display control unit 24 shifts the coordinates of the reference position to the positive direction of the x axis by a predetermined amount $\Delta x$. Similarly, every time a user pushes the downward button of the cross key, it shifts the coordinates of the reference position to the positive direction of the y axis by a predetermined amount $\Delta y$. After the rightward button is pushed n times and the downward button is pushed m times, the display control unit 24 cuts out the range from (Rx, Ry) to (Rx+ui, Ry+vi) of the enlarged bitmap image, with the coordinates of the reference position defined as (Rx, Ry)=(n$\times \Delta x$, m$\times \Delta y$), as illustrated in FIG. 5.

Every time a user pushes the leftward button of the cross key, the display control unit 24 shifts the coordinates of the reference position to the negative direction of the x axis by a predetermined amount $\Delta x$. Similarly, every time a user pushes the downward button of the cross key, it shifts the coordinates of the reference position to the negative direction of the y axis by a predetermined amount $\Delta y$. When the display control unit 24 changes the reference position according to the user's instruction operation, assuming that Rx<0 in the coordinates (Rx, Ry) of the changed reference position, the expression Rx=0 is established and assuming that Ry<0, the expression Ry=0 is established. Assuming that $\beta \times ui > Rx+ui$, the expression Rx=$\beta \times ui - ui$ is established and assuming that $\beta \times vi > Ry+vi$, the expression Ry=$\beta \times vi - vi$ is established.

Every time the reference position is changed, the display control unit 24 cuts the range of (Rx+ui, Ry+vi) starting from the coordinates (Rx, Ry) of the changed position, out of the enlarged bitmap image.

The display control unit 24 arranges a part (partial image) of the enlarged bitmap image corresponding to the i-th element data obtained by cutting it out, in an area indicated by the information showing the arrangement position of the i-th element data (the information for specifying the drawing range or the image element circumscribed rectangle included in the element data).

Namely, it arranges a partial image cut out from the range from (Rx, Ry) to (Rx+ui, Ry+vi) in the coordinate system of the enlarged bitmap image, in the range from ($\xi$+ui_lt, $\eta$+vi_lt) to ($\xi$+ui_rb, $\eta$+vi_rb) of the display unit 14, with respect to the respective element data (i=1, 2, ... N).

Further, the display control unit 24 not only displays the image on the display unit 14, but also transmits the display instruction to a specified destination address. The destination address may be a user's portable terminal. The device that becomes the destination displays the image according to the above instruction. In this case, the information on the size of the display unit 14 means the size (the number of pixels on the length and the width) of a device for display (what is called, a displaying means) such as the portable terminal.

[Operation]

The document processor 1 formed as mentioned above, according to the exemplary embodiment, operates as follows.

Figure 6:
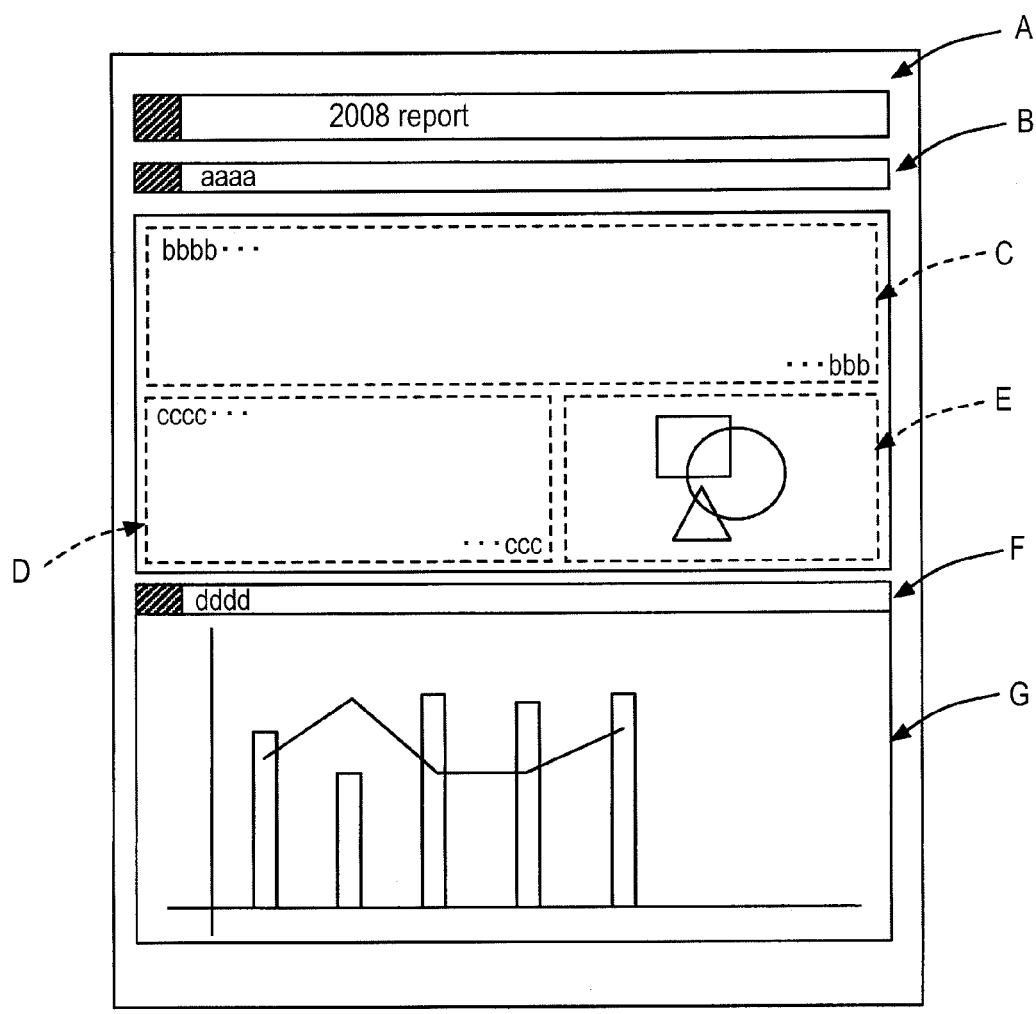
FIG. 6 is a view for use in describing a concrete example of the target document to be processed by the document processor, according to the exemplary embodiment of the invention.

In the following operation example, for the sake of description, it is assumed that the target document (bitmap image) contains a title portion A by letters, a subtitle portion B, a first paragraph portion C, a second paragraph portion D, a graphic portion E, a graph title portion F, and a graph portion G, as illustrated in FIG. 6 and that the size (the width w and the height h) of the target document agrees with the number of pixels (the width Px and the height Py) of the display unit (in this case, α'=1).

Figure 7:
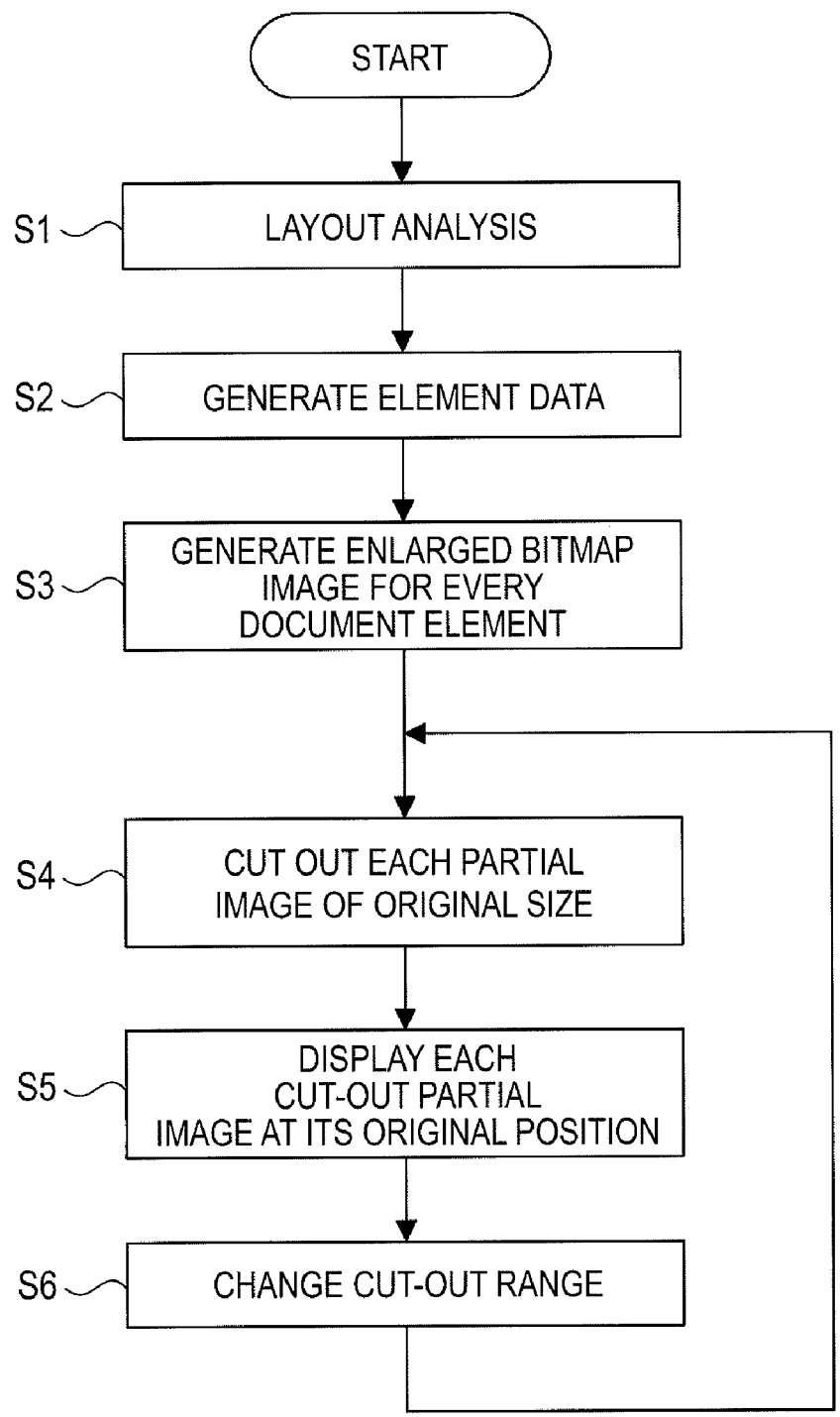
FIG. 7 is a flow chart showing an example of the processing by the document processor, according to the exemplary embodiment of the invention.
Figure 8A:
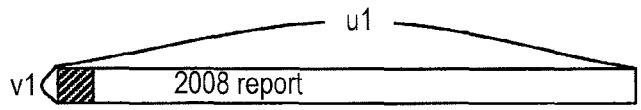
FIGS. 8A to 8D are views for use in describing an example of the processing of document elements by the document processor, respectively, according to the exemplary embodiment of the invention.

The document processor 1 starts the processing illustrated in FIG. 7, specifies the title portion A, the subtitle portion B, the first paragraph portion C, the second paragraph portion D, the graphic portion E, the graph title portion F, and the graph portion G as the document elements respectively (S1), according to the processing of the layout analysis, takes out the information indicating the areas occupied by the respective document elements and the images of the respective portions, and stores the both associated with each other into the storing unit 12 as the element data (S2). As an example, with respect to the title portion A, the image having the width u1 and the height v1 is taken out, as illustrated in FIG. 8A.

Figure 8B:
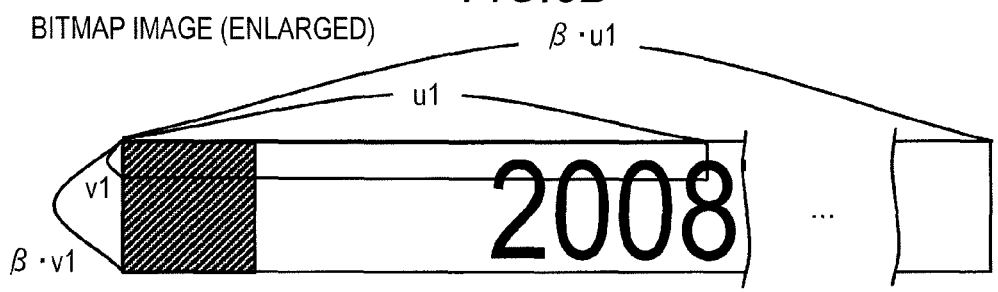
Figure 8C:
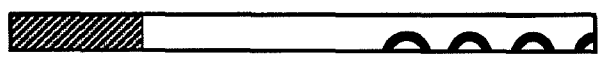

The document processor 1 generates an enlarged bitmap image (element image) (S3) obtained by enlarging the image which is taken out in the processing S2 from the range occupied by each of the document elements, at a specified enlargement ratio β. The title portion A becomes the image having the width β×u1 and the height β×v1, as illustrated in FIG. 8B. The document processor 1 cuts out a partial image for the size of the original document element (S4), from the enlarged bitmap image obtained from each of the document elements according to the enlargement processing in the processing S3. With respect to the title portion A, it cuts out the partial image having the original width u1 and the height v1, from the image having the width β×u1 and the height β×v1 obtained through the enlargement processing (refer to FIG. 8B). The cut out range may initially expand from the portion including the left upper corner of the enlarged bitmap image. As the result, the title portion A becomes the image as illustrated in FIG. 8C.

Figure 8D:
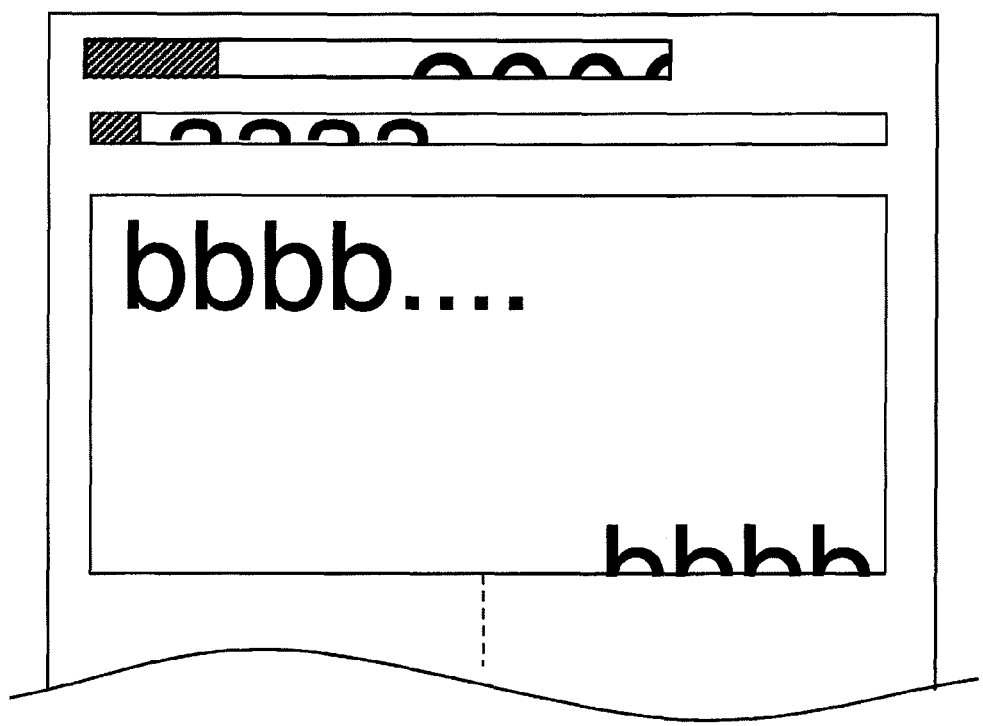

The document processor 1 performs the cutting out processing for every document element found through the layout analysis and arranges the cut out partial images of the respective document elements, in the respective original arrangement positions of the respective document elements (S5). As the result of the arrangement, the images are as illustrated in FIG. 8D.

The document processor 1 displays the image resulting from the arrangement of the respective partial images on the display unit 14. The document processor 1 changes the range to be cut out in the processing S4 every time a user makes an instruction to move the cut out range (S6) and repeats the processing from the processing S4.

According to the exemplary embodiment, when a user makes an operation to move the cut out range to the right direction, the cut out ranges in all the document elements are moved to the right direction (excluding the document element with the right end already displayed). The document processor 1 cuts out and displays a part of the element image of each corresponding document element, in each range occupied by each document element in the target document, and moves the cut out range to a specified direction at a specified speed.

Here, the cut out range is changed, by way of example, by a user's operation; however, it is not restricted to this but the document processor 1 may move the cut out range to the right direction by a predetermined amount at a predetermined timing. When the cut out range reaches the right end of the enlarged bitmap image, it may move the cut out range to the lower direction by a predetermined amount and further move the above range to the position including the left end of the enlarged bitmap image. According to the above mentioned processing, each document element is scroll-displayed in the order of the raster scan (the order from the left upper corner to the right lower corner; moving from left to right in every one line and reaching the right end before moving to the left end in the next line).

Figure 9A:
FIGS. 9A to 9C are views for use in describing an example of display control performed by the document processor, respectively, according to the exemplary embodiment of the invention.
Figure 9B:
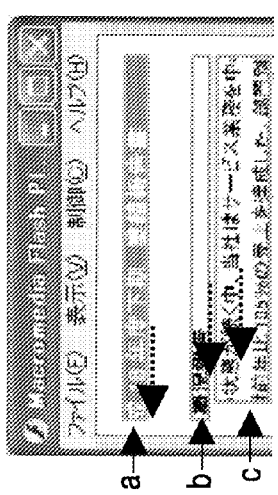
Figure 9C:
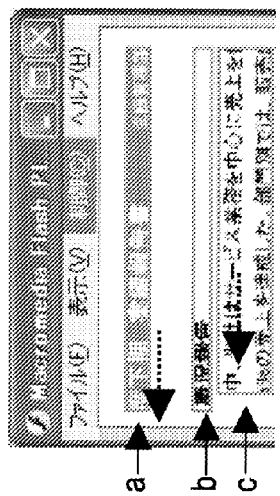

In this example, every document element is scroll-displayed at the same time, as illustrated in FIGS. 9A to 9C (FIG. 9A). The document element reaching the endpoint (it is the right end when there is only one line and it is the right lower corner when there is plural lines) stops scrolling (FIG. 9B: the subtitle portion B has reached the endpoint) and the document element which has not reached the endpoint continues scrolling (FIG. 9C: the title portion A and the first paragraph portion C have not reached the endpoint yet).

Modified Example 1

In this exemplary embodiment, the scroll speed (the shift amount of the cut out range for one time or for a unit time) may differ in every document element so that every scrolling may be finished at the same time. More specifically, the total scroll amount of the i-th document element is defined as Si. The total scroll amount Si is equal to the width ui of the document element when the document element is scrolled only in the X axis direction (when it is not scrolled in the Y axis direction). When it is also scrolled in the Y axis direction, the total scroll amount becomes the value obtained by multiplying the width ui by the number of lines (the number of the shifts to the Y axis direction). The number of lines may be defined by the maximum integer not exceeding the value obtained by dividing the height vi of the document element by the scroll amount $\Delta Sy\_i$ in the Y axis direction. In the i-th document element, the scroll amount $\Delta Sy\_i$ in the Y axis direction is larger than zero and equal to or less than the value of the height vi of the document element. For example, the value γ·vi obtained by multiplying vi by the constant γ larger than zero and not more than one may be defined as $\Delta Sy\_i$.

Next, in the total scroll amount Si (i=1, 2, . . . N) of each document element, the largest amount max [Si] (hereinafter, the value is defined as Smax) is selected. The max [Qi] means the maximum Qi of Qi (i=1, 2, . . . ). The maximum step amount Δxmax is larger than zero and not more than the minimum value min [ui] when the minimum min [ui] of the widths ui of the respective document elements is selected. Here, the min [Qi] means the minimum Qi of Qi (i=1, 2, . . . ). For example, the value γ·min [ui] obtained by multiplying the min [ui] by the constant γ of one or less may be defined as Δxmax. The Δxmax may be adjusted according to the letter size (font size) included in the document element. For example, the standard font size may be previously determined in order to define the γ·ϵ·min [ui] as the Δxmax by multiplying the standard font size by the ratio ϵ of the standard font size and the real font size. In this case, when Δxmax>min [ui], the value is corrected according to the expression Δxmax=min [ui].

The scroll speed (the shift amount of the cut out range for one scroll or for a unit time) Δxi of the i-th document element is obtained as Δxi=(Si/Smax)×Δxmax. The scroll amount (the shift movement of the cut out range) for one scroll or for a unit time is determined to satisfy the following conditions, according to the total scroll amount defined for every document element.

The total number of shift (total movement time) taken until Si is shown by Si/Δxi=Smax/Δxmax and it becomes a constant value regardless of i. The scrolling is finished by the same number of times (same period of time) in every document element.

Modified Example 2

In the exemplary embodiment, the scroll amount may differ in one scroll or by a unit time in every document element, according to whether an image included in the document element is a letter string or not (diagram, drawing, and so on). When the target document contains a drawing instruction like PDF, whether the image included in the document element contains the letter string or not, is determined by whether the drawing instruction concerned to each document element is an instruction of drawing a letter string or not, and when the target document contains a bitmap image, it is determined through the processing of the well-known text/image separation.

Modified Example 3

When the size of the i-th document element detected by the document element detecting unit 22, in other words, the width ui or the height vi is lower than a predetermined threshold Th, the i-th document element may be combined with the adjacent document element. Alternatively, the width and the height may be enlarged in the range out of contact with the adjacent document element.

According to the exemplary embodiments, each of the layout document elements may be displayed in an enlarged way while keeping the layout of the whole document, regardless of the size of the display unit, by enlarging the contents of the respective document elements and scroll-displaying them in the respective areas where the respective original document elements are arranged.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the skilled in the art to understand the invention for various exemplary embodiments and with the various modifications as are suited to the particular use contemplated. It is intended that the scope of the invention be defined by the following claims and their equivalents.

What is claimed:

1. A document processor comprising:
  a unit which receives document information including a plurality of document elements as a target document;
  a unit which detects each of the document elements from the received target document;
  a unit which generates an element image enlarged by a specified ratio, of each image of the detected document elements; and
  a display control unit which controls display so that an element image of the corresponding document element is displayed only in a range occupied by the document element in the target document, wherein the display control unit cuts out a portion of the element image of the corresponding document element, displays the portion in the range occupied by the document element in the target document, and shifts the cut out range at a specified speed in a specified direction.

2. A document processing method, comprising:
  receiving document information including a plurality of document elements as a target document;
  detecting each of the document elements from the received target document;
  generating an element image enlarged by a specified ratio, in each element image of the detected document elements; and
  controlling display to display an element image of the corresponding document element only in a range occupied by the corresponding document element in the target document by cutting out a portion of the element image of the corresponding document element, displaying the portion in the range occupied by the document element in the target document, and shifting the cut out range at specified speed in a specified direction.

3. A computer readable recording medium storing a program causing a computer to execute a process for processing a document, the process comprising:
  receiving document information including a plurality of document elements as a target document;
  detecting each of the document elements from the received target document;
  generating an element image enlarged by a specified ratio, in each element image of the detected document elements; and
  controlling display to display an element image of the corresponding document element only in a range occupied by the corresponding document element in the target document by cutting out a portion of the element image of the corresponding document element, displaying the portion in the range occupied by the document element in the target document, and shifting the cut out range at a specified speed in a specified direction.

* * * * *